United States Patent [19]

Nagasawa et al.

[11] Patent Number: 5,598,275
[45] Date of Patent: Jan. 28, 1997

[54] VIDEO SIGNAL RECORDING APPARATUS HAVING AN INTERVAL RECORDING MODE COMPATIBLE WITH AN OVERLAP RECORDING MODE

[75] Inventors: Kenichi Nagasawa, Kawasaki; Koji Takahashi, Yokohama; Chikara Sato, Kawasaki, all of Japan

[73] Assignee: Canon Kabushiki Kaisha, Tokyo, Japan

[21] Appl. No.: 265,623

[22] Filed: Jun. 24, 1994

Related U.S. Application Data

[63] Continuation of Ser. No. 792,921, Nov. 15, 1991, abandoned.

[30] Foreign Application Priority Data

Nov. 20, 1990 [JP] Japan .................................... 2-316255

[51] Int. Cl.$^6$ .............................. H04N 5/91; H04N 5/76; H04N 5/225; H04N 5/262
[52] U.S. Cl. ...................... 386/117; 358/906; 358/909.1; 348/239; 386/46
[58] Field of Search ................................... 358/335, 310, 358/342, 906, 909.1; 348/207, 220, 239, 578, 589, 594, 595; 360/33.1, 35.1; H04N 5/76, 5/78, 5/92, 5/225, 9/79, 5/262, 5/268, 5/272

[56] References Cited

U.S. PATENT DOCUMENTS

| | | | |
|---|---|---|---|
| 4,271,437 | 6/1981 | Scott | 360/9 |
| 4,723,180 | 2/1988 | Mitsuhashi et al. | 360/52 |
| 4,858,012 | 8/1989 | Hino et al. | 358/906 |
| 5,003,404 | 3/1991 | Yoshimura et al. | 358/335 |
| 5,016,112 | 5/1991 | Nakajima et al. | 358/906 |
| 5,051,845 | 9/1991 | Gardner et al. | 360/14.1 |
| 5,124,814 | 6/1992 | Takahashi et al. | 358/341 |
| 5,130,860 | 7/1992 | Nagashima | 360/33.1 |
| 5,168,363 | 12/1992 | Kojima et al. | 358/906 |

FOREIGN PATENT DOCUMENTS

| | | | |
|---|---|---|---|
| 0423681 | 4/1991 | European Pat. Off. | H04N 5/265 |
| 01248878 | 10/1989 | Japan | H04N 5/262 |

Primary Examiner—Thai Q. Tran
Attorney, Agent, or Firm—Fitzpatrick, Cella, Harper & Scinto

[57] ABSTRACT

A video signal recording apparatus includes a memory for storing a one-picture portion of an input video signal. An overlapping device gradually switches a first video signal, read from the memory, to a second video signal during a first predetermined time period, and provides an output video signal. A recording device records the video signal output from the overlapping device. A first manual operation member sets the video signal recording apparatus to an overlap mode, in which the overlapping device is operated in response to a start of recording by the recording device. A second manual operation member sets the video signal recording apparatus to an interval recording mode, in which the recording device is periodically operated to record during every second predetermined time period. A determination device determines the first and second predetermined time periods such that the second predetermined time period is longer than the first predetermined time period when the video signal recording apparatus is in the overlap mode and in the interval recording mode.

10 Claims, 3 Drawing Sheets

VIDEO SIGNAL RECORDING APPARATUS HAVING AN INTERVAL RECORDING MODE COMPATIBLE WITH AN OVERLAP RECORDING MODE

This application is a continuation of application Ser. No. 07/792,921 filed Nov. 15, 1991, now abandoned.

BACKGROUND OF THE INVENTION

1. Field of the Invention

This invention relates to a video signal recording apparatus, and more particularly, to a video signal recording apparatus having an overlap function and provided with a memory capable of storing a video signal for one picture frame.

2. Description of the Related Art

Recently, a memory capable of storing a video signal for one picture frame, a so-called field memory or frame memory, has been used in many apparatuses for commercial use. On the other hand, a technique of providing a video signal with various kinds of special effects using a memory has been practiced in apparatuses for television broadcast.

In providing an apparatus for commercial use with such special effects, however, there exist problems, such as limitation in the capacity of a memory, incapability of providing a complicated operation control unit, and the like. Hence, there is a limitation in providing such special effects.

SUMMARY OF THE INVENTION

The present invention has been made in cosideration of the above-described problems.

It is an object of the present invention to provide a video signal recording apparatus which can obtain effective special effects with a simple operation using a so-called overlap function, in which a picture stored in a memory is gradually changed to another picture during a predetermined time period in accordance with a start of recording.

It is another object of the present invention to provide a video signal recording apparatus which can execute an overlap function with a simple operation and confirm an image stored in a memory.

These object are accomplished, according to one aspect of the present invention, by a video signal recording apparatus comprising (a) signal processing means including a memory capable of storing a one-picture portion of an input video signal, and overlapping means for gradually switching a video signal read from the memory into another video signal during a predetermined time period, (b) recording means capable of recording an output from the signal processing means for recording a video signal, and (c) control means for controlling the signal processing means, the control means setting the signal processing means to an overlap mode for operating the overlapping means in accordance with a start of recording by the recording means according to an operation of a manual operation member, and controlling the apparatus so that the signal processing means outputs the video signal stored in the memory during an operating period of the manual operation member when the recording means does not perform a recording operation.

It is still another object of the present invention to provide a video signal recording apparatus in which interval recording and an overlap function are compatible, and no misoperation occurs.

This object is accomplished, according to another aspect of the present invention, by a video signal recording apparatus comprising (a) a memory capable of storing a one-picture portion of an input video signal, (b) overlapping means for gradually switching a video signal read from the memory to another video signal during a first predetermined time period, (c) recording means capable of recording an output from the overlapping means for recording a video signal, (d) a first manual operation member for setting the apparatus to an overlap mode for operating the overlapping means in accordance with a start of recording by the recording means, (e) a second manual operation member for setting the apparatus to an interval recording mode for periodically operating the recording means during every second predetermined time period, and (f) determination means for determining the first and second predetermined time periods so that the second predetermined time period is longer than the first predetermined time period when the apparatus is in the overlap mode and in the interval recording mode.

According to a further aspect of the present invention, a video signal recording apparatus comprises (a) a memory capable of storing one-picture portion of an input video signal, (b) overlapping means for gradually switching a video signal read from said memory to another video signal during a predetermined time period, (c) display means for displaying the video signal read from said memory, (d) recording means for recording an output of said overlapping means as a video signal, and (e) control means, including a manual operation member for setting said apparatus to an overlap mode for operating said overlapping means in response to a start of recording by said recording means according to an operation state of the manual operation member, and for making said display means display the video signal read from said memory during an operating period of said manual operation member when said recording means does not perform a recording operation.

According to another aspect of the present invention, a video signal recording apparatus includes (a) a memory capable of storing a one-picture portion of an input video signal, (b) overlapping means for gradually switching a video signal read from said memory to another video signal during a predetermined time period, (c) recording means for recording an output from said overlapping means as a video signal, (d) a first manual operation member for commanding a start of recording by said recording means, (e) a second manual operation member for setting said apparatus to an overlap mode, (f) control means for operating said overlapping means in response to an operation of said first manual operation member when the apparatus is in said overlap mode, and (g) output means for outputting a video signal read from said memory during an operating period of said second manual operation member when said recording means does not perform a recording operation.

According to yet another aspect of the present invention, a video signal processing device comprises (a) a memory capable of storing a one-picture portion of an input video signal, (b) overlapping means for gradually switching a video signal read from said memory to another video signal during a predetermined time period, (c) a first manual operation member, (d) a second manual operation member for setting said apparatus to an overlap mode, (e) control means for operating said overlapping means in response to an operation of said first manual operation member when the apparatus is in said overlap mode, and (f) output means for outputting a video signal read from said memory during an operating period of said second manual operation member.

According to yet another aspect of the present invention, a video signal processing device includes (a) a memory capable of storing a one-picture portion of an input video signal, (b) overlapping means for gradually switching a video signal read from said memory to another video signal during a predetermined time period, (c) a manual operation member, (d) output means for outputting a video signal read from said memory during an operating period of said manual operation member, and (e) control means for operating said overlapping means in response to the completion of the operation of said manual operation member.

According to a further aspect of the present invention, a video signal recording apparatus includes (a) signal processing means including a memory capable of storing a one-picture portion of an input video signal, and overlapping means for gradually switching a video signal read from said memory to another video signal during a first predetermined time period, (b) recording means for recording an output from said signal processing means as a video signal, (c) control means for periodically operating said recording means during every second predetermined time period, and (d) determination means for determining said first and second predetermined time periods so that said second predetermined time period is longer than said first predetermined time period while said overlapping means operates.

The foregoing and other objects and features of the present invention will become more apparent from the following detailed description of the preferred embodiment taken in connection with the accompanying drawings.

DETAILED DESCRIPTION OF THE PREFERRED EMBODIMENT

An explanation will now be provided of an embodiment in which the present invention is applied to a camcorder.

Figure 1:
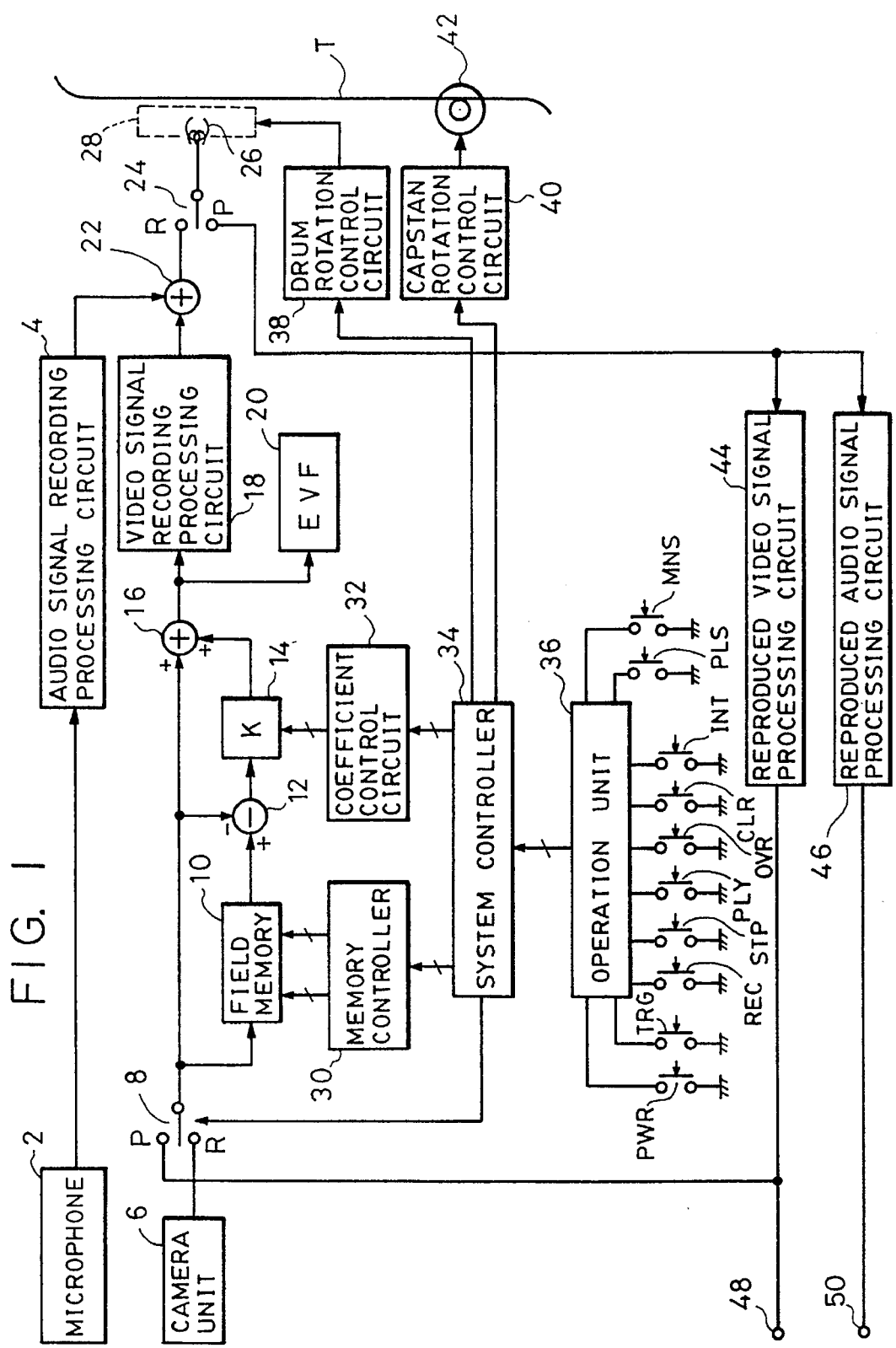
FIG. 1 is a block diagram showing the schematic configuration of a camcorder (a video cassette recorded formed integral with a camera) according to an embodiment of the present invention.

FIG. 1 is a block diagram showing the schematic configuration of a camcorder according to an embodiment of the present invention. In FIG. 1, there are shown an operation unit 36 of the camcorder, a power-supply switch PWR, a trigger key TRG, a picture-recording key REC, a stop key STP, a playback key PLY, an overlap key OVR, a clear key CLR, an interval-recording key INT, a plus key PLS, and a minus key MNS.

A system controller 34 controls respective units of the apparatus by the operation of the operation unit 36. An explanation will now be provided of the operation of the camcorder with reference to a flowchart showing the operation of the system controller 34.

Figure 2:
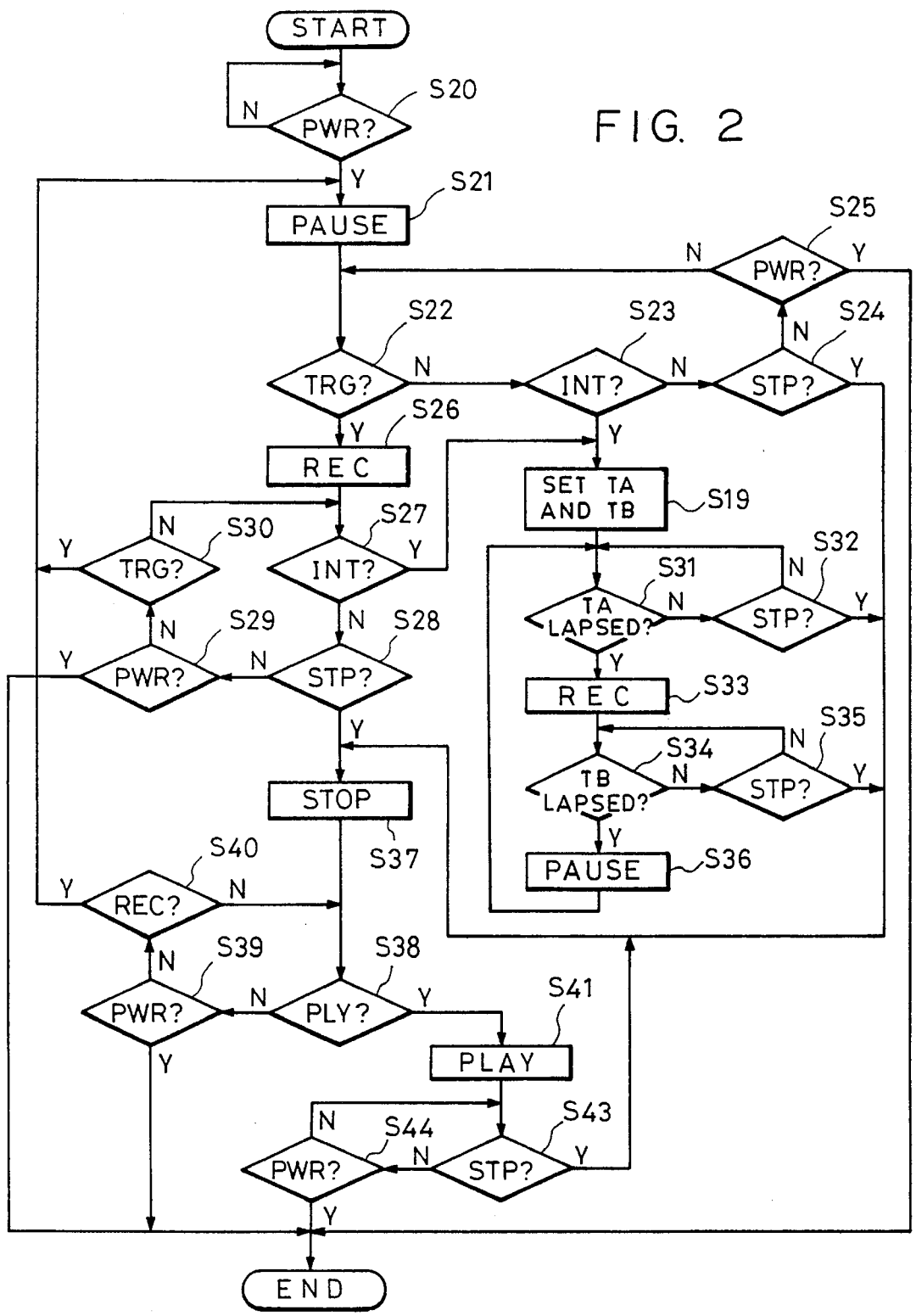
FIG. 2 is a flowchart illustrating the operation of a system controller for switching modes in the camcorder shown in FIG. 1.

FIG. 2 is a flowchart illustrating the operation of the system controller 34 for switching modes in the camcorder shown in FIG. 1.

When the power-supply switch PWR has been switched on (step S20), the apparatus is in a state of temporarily stopping recording (a recording pause state) (step S21).

In this state, the system controller 34 connects a switch 8 to side R. Hence, a video signal from a camera unit 6 is supplied to an electronic view finder (EVF) 20 via the switch 8 and an adder 16, and an image of an object being photographed by the camera unit 6 can be monitored by the EVF 20. On the other hand, by the control of the system controller 34, a drum rotation control circuit 38 rotates a rotating drum 28 mounting a rotating magnetic head 26 at the same speed as in a recording operation, and a capstan rotation control circuit 40 sets a capstan 42 to a stop state.

If the trigger key TRG is operated in this recording pause state (step S22), the apparatus is in a recording state (step S26).

In the recording state, a video signal provided in the form of a signal suitable for magnetic recording by a video signal recording processing circuit 18, and an audio signal picked up by a microphone 2 and provided in the form of a signal suitable for magnetic recording by an audio signal recording processing circuit 4 are added together in an adder 22, and the resultant signal is supplied to the magnetic head 26 via an R-side terminal of a switch 24. By the control of the system controller 34, the drum rotation control circuit 38 rotates the drum 28 at a predetermined speed, and the capstan rotation control circuit 40 rotates the capstan 42 at a predetermined speed. The output signal of the adder 22 is thereby recorded on a magnetic tape T by the rotating magnetic head 26 while sequentially forming helical tracks.

If the trigger key TRG is operated in the recording state (step S30), the apparatus returns to the above-described recording pause state.

If the interval-recording key INT is operated in the recording pause state or the recording state (step S23 or S27), the process proceeds to step S19 for interval recording. In step S19, a recording interval TA and a recording time TB of each recording are set by operating the plus key PLS and the minus key MNS.

When the apparatus has shifted to an interval recording state, the lapse of the recording interval TA is awaited (step S31), and the apparatus proceeds to a recording mode (step S33). When the recording time TB has lapsed after shifting to the recording mode (step S34), the apparatus shifts to the recording pause state (step S36). Subsequently, interval recording is performed by repeating steps S31, S33, S34 and S36. About 60 seconds and about 0.5 seconds are suitable for the recording interval TA and the recording time TB, respectively. In the present embodiment, TA and TB can be set between 30 seconds–2 minutes, and between 0.1 seconds–10 seconds, respectively, by operating the above-described plus key PLS and minus key MNS.

If the stop key STP is operated in the recording pause state, the recording state or the interval recording state (steps S24, S28, S32 or S35), the apparatus shifts to the stop state (step S37). That is, the system controller 34 stops the drum 28 and the capstan 42 via the drum rotation control circuit 38 and the capstan rotation control circuit 40, respectively.

If the picture-recording key REC is operated in the stop state (step S40), the apparatus shifts again to the recording pause state.

If the playback key PLY is operated in the stop state (step S38), the apparatus is set to a playback state. In the playback state, the system controller 34 connects the switches 8 and 24 to sides P, and rotates the drum 28 and the capstan 42 at the same speeds as in the recording operation via the drum rotation control circuit 38 and the capstan rotation control circuit 40, respectively.

The rotating head 26 thereby reproduces a recorded signal. The reproduced signal is supplied to a reproduced video signal processing circuit 44 and a reproduced audio signal processing circuit 46. An audio signal reproduced by the reproduced audio signal processing circuit 46 is output to the outside from a sound output terminal 50. A video signal reproduced by the reproduced video signal processing circuit 44 is output to the outside from an image output terminal 48. The reproduced video signal is also input to a field memory 10 and the adder 16 via side P of the switch 8, and is converted into an image on the EVF 20.

If the stop key STP is operated in the playback state (step S43), the apparatus shifts to the above-described stop state. If the power-supply key PWR is operated in the recording pause state, the recording state, the stop state or the playback state (steps S25, S29, S39 or S44), the system controller 34 stops the control of respective units, and terminates the processing.

Figure 3:
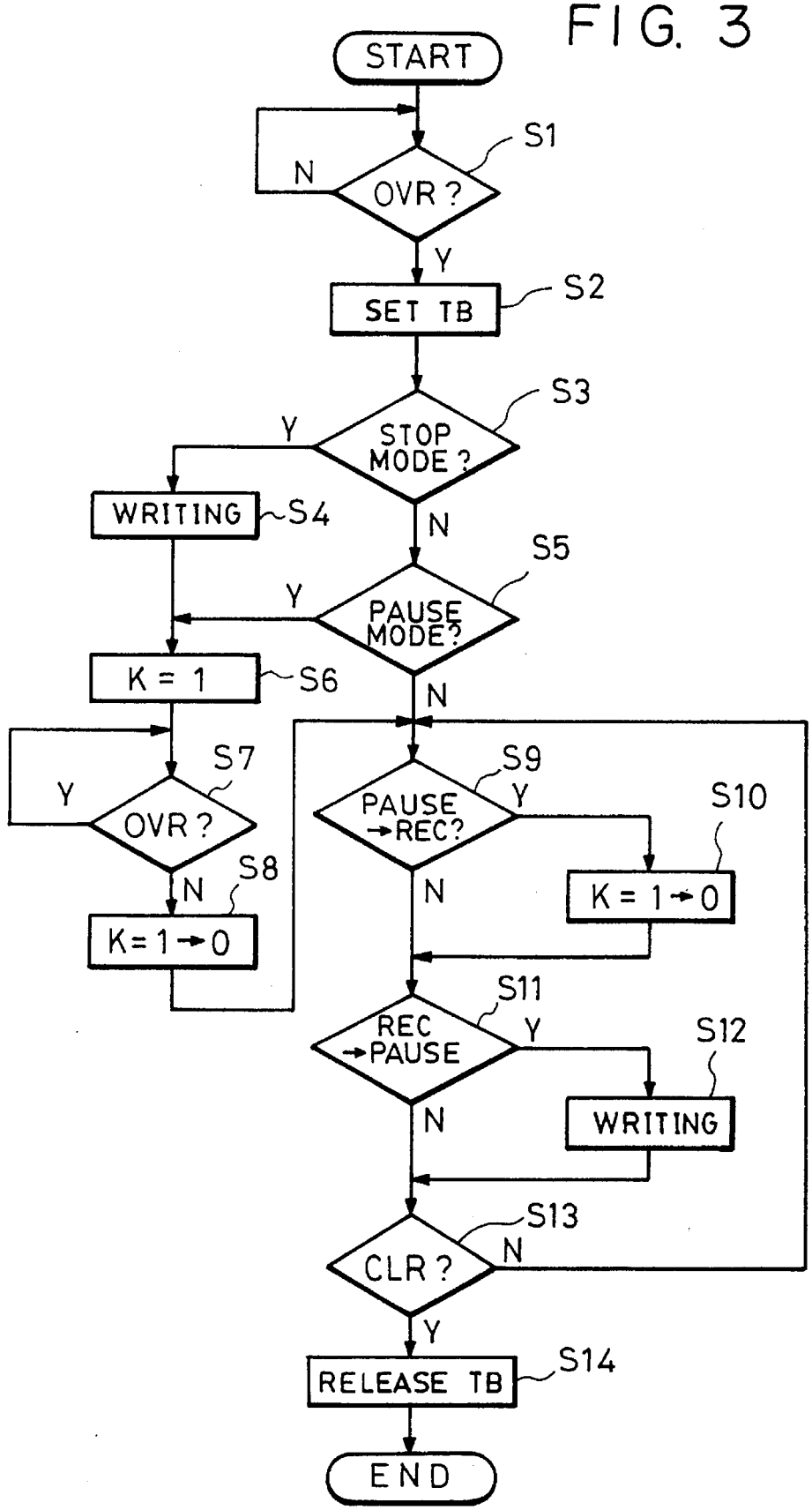
FIG. 3 is a flowchart illustrating the operation of an overlap mode in the camcorder shown in FIG. 1.

The mode shifting operation of the camcorder in the present embodiment has been explained. An explanation will now be provided of an operation relating to an overlap mode, which is a feature of the present invention, with reference to the flowchart shown in FIG. 3.

When the overlap key OVR has been operated and the apparatus has been set in the overlap mode (step S1), the system controller 34 sets the above-described recording time TB (a second predetermined time period) in the interval recording mode to the same value as a time TR (a first predetermined time period) necessary for an overlap operation (step S2). In the present embodiment, since 3 seconds are postulated for the overlap time TR, the recording time TB in the interval recording mode is forcibly set to 3 seconds.

If the apparatus is in the stop state when the overlap key OVR has been operated (step S3), the system controller 34 supplies the field memory 10 with a write enable pulse for a period of one field via a memory controller 30 so as to write a one-field portion of a video signal supplied to the field memory 10 at that time (step S4), and the process proceeds to step S6.

If the apparatus is in the recording pause state when the overlap key OVR has been operated (step S5), the process proceeds to step S6.

In step S6, the system controller 34 sets the coefficient K of a coefficient unit 14 to K=1 via a coefficient control circuit 32. In this case, the video signal from the switch 8 is offset in the adder 16. Hence, the video signal read from the field memory 10 is output from the adder 16. Since the output of the adder 16 is supplied to the EVF 20, an image stored in the memory 10 can be confirmed on the EVF 20.

If the operation of the overlap key OVR is subsequently released (step S7), the coefficient K of the coefficient unit 14 is changed from 1 to 0 during the above-described overlap time TR by controlling the coefficient control circuit 32. If the coefficient K of the coefficient unit 14 is K=0, the video signal from the switch 8 is output to the adder 16 without being modified. Hence, by changing the coefficient K from 1 to 0, the signal output from the adder 16 is switched (while overlapping) from the video signal read from the field memory 10 to the video signal from the switch 8 during the predetermined time period TR. Even if the operation of the overlap key OVR is released, the apparatus is maintained in the overlap mode.

Such an operation is convenient in the recording pause state for the preparation of overlap recording to be performed, and the effect of overlap recording can be confirmed in the stop state.

No particular dedicated key is used in such preparatory and confirming operations, but these operations are performed only by operating the conventional interval-recording key INT and overlap key OVR. Since such new functions can be provided with a very simple operation, the configuration of the present embodiment is suitable for providing an apparatus for commercial use with an overlap recording function.

If the apparatus shifts from the recording pause state to the recording state by the operation of the trigger key TRG, that is, if recording is started, when the apparatus is in the overlap mode via steps S1–S8 (step S9), the coefficient K of the coefficient unit 14 is changed from 1 to 0 during the above-described overlap period TR (step S10). The video signal to be recorded is thereby switched while being overlapped from an image stored in the memory at the timing of the start of recording to an image being photographed by the camera unit 6.

If the apparatus shifts to the recording pause state by the operation of the trigger key TRG in the recording state, that is, if recording is stopped (step S11), the system controller 34 sets the memory 10 to a write enable state during a period of one field via the memory controller 30. A photographing signal from the camera unit 6 at that time is thereby written in the memory 6 for a period of one field (step S12).

When recording is resumed, the picture stored in step S12 is recorded while being overlapped with the next picture to be recorded during the predetermined time period TR.

This overlap operation is also performed when the apparatus shifts from the recording pause state to the recording state during interval recording. Moreover, since the overlap time period TR and the interval recording time TB are set to be equal, it has become possible to automatically perform interval recording utilizing the overlap function.

Accordingly, a new type of recording wherein pictures momentarily changing during a few seconds are sequentially subjected to overlap recording can be performed with a very simple operation without misoperation. Hence, the above-described configuration is very useful for applying this new mode to an apparatus for commercial use.

If the clear key CLR is operated while the above-described overlap mode is set (step S13), the interval recording time TB adjusted to the overlap time TR is released and set to the original TB, for example, 0.5 seconds (step S14), and the overlap processing is terminated.

As explained above, in the camcorder of the present embodiment, the practical use of the overlap function, and new functions utilizing the overlap function are realized with a very simple operation. Hence, the configuration of the present embodiment is very useful when the overlap function is applied to an apparatus for commercial use.

Although, in the above-described embodiment, the interval recording time TB and the overlap time TR are set to be equal, the interval recording time TB may be set to be longer than the overlap time TR. In such a case, an entirely new type of recording, wherein pictures momentarily changing during a few seconds can be sequentially subjected to overlap recording, can be realized without misoperation.

An explanation has been provided illustrating an operation of gradually switching the entire image stored in the memory to an image being photographed, i.e., so-called "cross fade" as the overlap function in the present embodiment. However, the present invention may also be applied to an operation of gradually changing the ratio of the area occupied by an image stored in the memory to the area occupied by an image being photographed from 1:0 to 0:1, i.e., so-called "wipe", serving as the overlap function.

The individual components shown in outline or designated by blocks in the Drawings are all well-known in the video signal processing arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video signal recording apparatus, comprising:
   (a) overlapping means, operable in an overlap mode, for gradually switching and recording a first video signal to a second video signal during a first predetermined time period;
   (b) interval record means, operable in an interval record mode different from the overlap mode, for recording a video signal during a second predetermined time period, said interval record means automatically operating at every predetermined interval; and
   (c) control means for setting the second predetermined time period relative to the first predetermined time period to ensure the overlap mode and the interval record mode are compatible in a condition when said interval record means and said overlapping means are operating, said control means setting the second predetermined time period to be longer than the first predetermined time period when the interval record means and the overlapping means are operating.

2. A video signal recording apparatus according to claim 1, wherein said control means sets the second predetermined time period to be longer than the first predetermined time period when said interval record means and said overlapping means are operating concurrently.

3. A video signal recording apparatus according to claim 1, wherein said control means can vary the second predetermined time period independent of the first predetermined time period when said interval record means is operating solely.

4. A video signal recording apparatus according to claim 1, wherein said control means can vary the second predetermined time period independent of the first predetermined time period when said overlapping means is not operating.

5. A video signal recording apparatus, comprising:
   (a) signal processing means including (i) a memory for storing a one-picture portion of an input video signal, and (ii) overlapping means, operable in an overlap mode, for gradually switching a first video signal, read from said memory, to a second video signal during a first predetermined time period, and for providing an output video signal;
   (b) recording means for recording the video signal output from said signal processing means;
   (c) control means for periodically operating said recording means in an interval record mode different from the overlap mode, to automatically record during every second predetermined time period; and
   (d) determination means for setting the first and second predetermined time periods to ensure that the second predetermined time period is longer than the first predetermined time period while said overlapping means operates.

6. A video signal recording apparatus, comprising:
   (a) a memory for storing a one-picture portion of an input video signal;
   (b) overlapping means for (i) gradually switching a first video signal, read from said memory, to a second video signal during a first predetermined time period, and (ii) providing an output video signal;
   (c) recording means for recording the video signal output from said overlapping means;
   (d) a first manual operation member for setting said video signal recording apparatus to an overlap mode in which said overlapping means is operated in response to a start of recording by said recording means;
   (e) a second manual operation member for setting said video signal recording apparatus to an interval recording mode different from the overlap mode, in which said recording means is automatically and periodically operated to record during every second predetermined time period; and
   (f) determination means for setting the first and second predetermined time periods to ensure that the second predetermined time period is longer than the first predetermined time period when said video signal recording apparatus is in the overlap mode and in the interval recording mode.

7. An apparatus according to claim 6, wherein said determination means sets the second predetermined time period to be longer than the first predetermined time period by changing the second predetermined time period.

8. An apparatus according to claim 7, wherein said determination means can set the second predetermined time period to be shorter than the first predetermined time period when said video signal recording apparatus is not in the overlap mode.

9. An apparatus according to claim 6, wherein said determination means sets the second predetermined time period to be longer than the first predetermined time period by changing one of the first and second predetermined time periods according to an operation of said first manual operation member.

10. An apparatus according to claim 6, further comprising:
   image pickup means for forming a video signal from light from an object, wherein the second video signal comprises a video signal output from said image pickup means.

* * * * *

UNITED STATES PATENT AND TRADEMARK OFFICE
CERTIFICATE OF CORRECTION

PATENT NO. : 5,598,275
DATED : January 28, 1997
INVENTOR(S) : KENICHI NAGASAWA, ET AL.

It is certified that error appears in the above-indentified patent and that said Letters Patent is hereby corrected as shown below:

COLUMN 1:

Line 45, "object" should read --objects--.

COLUMN 2:

Line 22, "storing" should read --storing a--.

COLUMN 3:

Line 34, "recorded" should read --recorder--.

COLUMN 6:

Line 22, "6" should read --10--.
    Line 34, "recording" should read --recording,--.

Signed and Sealed this

Seventeenth Day of June, 1997

Attest:

BRUCE LEHMAN

*Attesting Officer*      *Commissioner of Patents and Trademarks*